United States Patent
Kidron et al.

(10) Patent No.: US 10,073,761 B2
(45) Date of Patent: Sep. 11, 2018

(54) LEGACY SYSTEM

(71) Applicant: HEWLETT PACKARD ENTERPRISE DEVELOPMENT LP, Houston, TX (US)

(72) Inventors: Adi Kidron, Yehud (IL); Eitan Katz, Yehud (IL); Oded Keret, Yehud (IL); David Landsberg, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 3 days.

(21) Appl. No.: 14/915,341

(22) PCT Filed: Sep. 30, 2013

(86) PCT No.: PCT/US2013/062530
§ 371 (c)(1),
(2) Date: Feb. 29, 2016

(87) PCT Pub. No.: WO2015/047365
PCT Pub. Date: Apr. 2, 2015

(65) Prior Publication Data
US 2016/0217058 A1    Jul. 28, 2016

(51) Int. Cl.
*G06F 9/44* (2018.01)
*G06F 11/36* (2006.01)
(Continued)

(52) U.S. Cl.
CPC ............ *G06F 11/3664* (2013.01); *G06F 8/70* (2013.01); *G06F 9/541* (2013.01); *G06F 9/543* (2013.01);
(Continued)

(58) Field of Classification Search
None
See application file for complete search history.

(56) References Cited

U.S. PATENT DOCUMENTS 8,639,743 B1 *   1/2014   Colton ............... G06F 9/45529
                                                     709/203
2004/0093580 A1   5/2004   Carson et al.
(Continued)

FOREIGN PATENT DOCUMENTS

CN          1126981          2/2008
CN          101136936        3/2008
(Continued)

OTHER PUBLICATIONS

Erich, Brendan, MWC 2013, Firefox OS, and More Web API Evolution, Mar. 6, 2013, 6 pages, http://brendaneich.com/2013/03/mwc-2013-firefox-os-and-more-web-api-evolution/.
(Continued)

*Primary Examiner* — Chameli Das

(57) ABSTRACT

An example method for creating and operating a mobile application for an existing legacy system is provided in accordance with an aspect of the present disclosure. The method includes encapsulating a plurality of user interface (UI) automation scripts of an existing legacy system with an application programming interface (API) wrapper associated with a mobile application. In response to a call from the mobile application, the method further includes utilizing a selected one of the plurality of recorded UI automation scripts in the API wrapper to execute at least one action in the legacy system. The method also includes returning results from the at least one action in the legacy system to the mobile application.

10 Claims, 6 Drawing Sheets

(51) Int. Cl.
    *G06F 17/30*     (2006.01)
    *G06F 9/54*     (2006.01)
    *G06F 8/70*     (2018.01)

(52) U.S. Cl.
    CPC .... *G06F 11/3612* (2013.01); *G06F 17/30893* (2013.01)

(56) References Cited

U.S. PATENT DOCUMENTS

| | | |
|---|---|---|
| 2004/0226027 A1 | 11/2004 | Winter |
| 2004/0230747 A1* | 11/2004 | Ims ................... G06F 17/30902 711/133 |
| 2005/0154591 A1* | 7/2005 | Lecoeuche .............. G10L 15/30 704/270.1 |
| 2005/0257196 A1 | 11/2005 | Hollander et al. |
| 2006/0026570 A1* | 2/2006 | Chan ....................... G06F 8/316 717/127 |
| 2006/0168115 A1 | 7/2006 | Loupia et al. |
| 2007/0192818 A1 | 8/2007 | Bourges-Sevenier et al. |
| 2010/0251340 A1 | 9/2010 | Martin et al. |
| 2011/0087802 A1* | 4/2011 | Witriol .............. G06F 17/30575 709/248 |
| 2011/0239104 A1* | 9/2011 | Prasad ................ G06F 11/3684 715/234 |
| 2017/0322929 A1* | 11/2017 | Hussain .............. G06F 9/45558 |

FOREIGN PATENT DOCUMENTS

| | | |
|---|---|---|
| CN | 101266543 | 9/2008 |
| WO | WO-2001016724 A2 | 3/2001 |
| WO | WO-2013032621 A1 | 3/2013 |

OTHER PUBLICATIONS

Hemel, Z., Methods and Techniques for the Design and Implementation of Domain-Specific Languages, Dec. 8, 2011; 234 pages, http://www.st.ewi.tudelft.nl/~arie/phds/Hemel.pdf.

Korean Intellectual Property Office, International Search Report and Written Opinion, Jun. 26, 2014, 10 pages, Daejeon Metropolitan City, Republic of Korea.

Lee, D, Automating the Mobile Device, (BLOG), Sep. 27, 2012, 6 pages, http://tech.xtremelabs.com/automating-the-mobile-device/.

VAADIN.com, Packaging Vaadin Apps for Home Screens and App Stores with PhoneGap, (BLOG), May 11, 2012, 9 pages, https://vaadin.com/blog/-/blogs/packaging-vaadin-apps-for-home-screens-and-app-stores-with-phonegap.

Massimo Colosimo et al, "Assessing Legacy System Migration Technologies through Controlled Experiments", Software Maintenance, 2007. ICSM 2007. IEEE International Conference O N, IEEE, PI Oct. 1, 2007, pp. 365-374.

\* cited by examiner

LEGACY SYSTEM

CROSS-REFERENCE TO RELATED APPLICATION

This application is a U.S. National Stage Application of and claims priority to International Patent Application No. PCT/US2013/062530, filed on Sep. 30, 2013, and entitled "LEGACY SYSTEM," the entire contents of which are hereby incorporated in its entirety.

BACKGROUND

Mobile technologies have seen dramatic improvements over the past years. Increased numbers of today's mobile users carry one or more mobile devices that they use to communicate with each other, reach the Internet, or access various application and services through wireless networks. Various devices such as Internet-enabled tablets, smartphones, laptops, televisions, and gaming consoles have become essential personal accessories, connecting users to friends, work, and entertainment. Users now have more choices and expect to have mobile access to all services, personal data, and content at all times. The increased number of users that utilize mobile devices stimulates business to make their services available to these mobile users and to provide improved communication options that can meet the increase in user demand, support the array of exiting/new services, and provide reliable communication.

DETAILED DESCRIPTION

Figure 1:
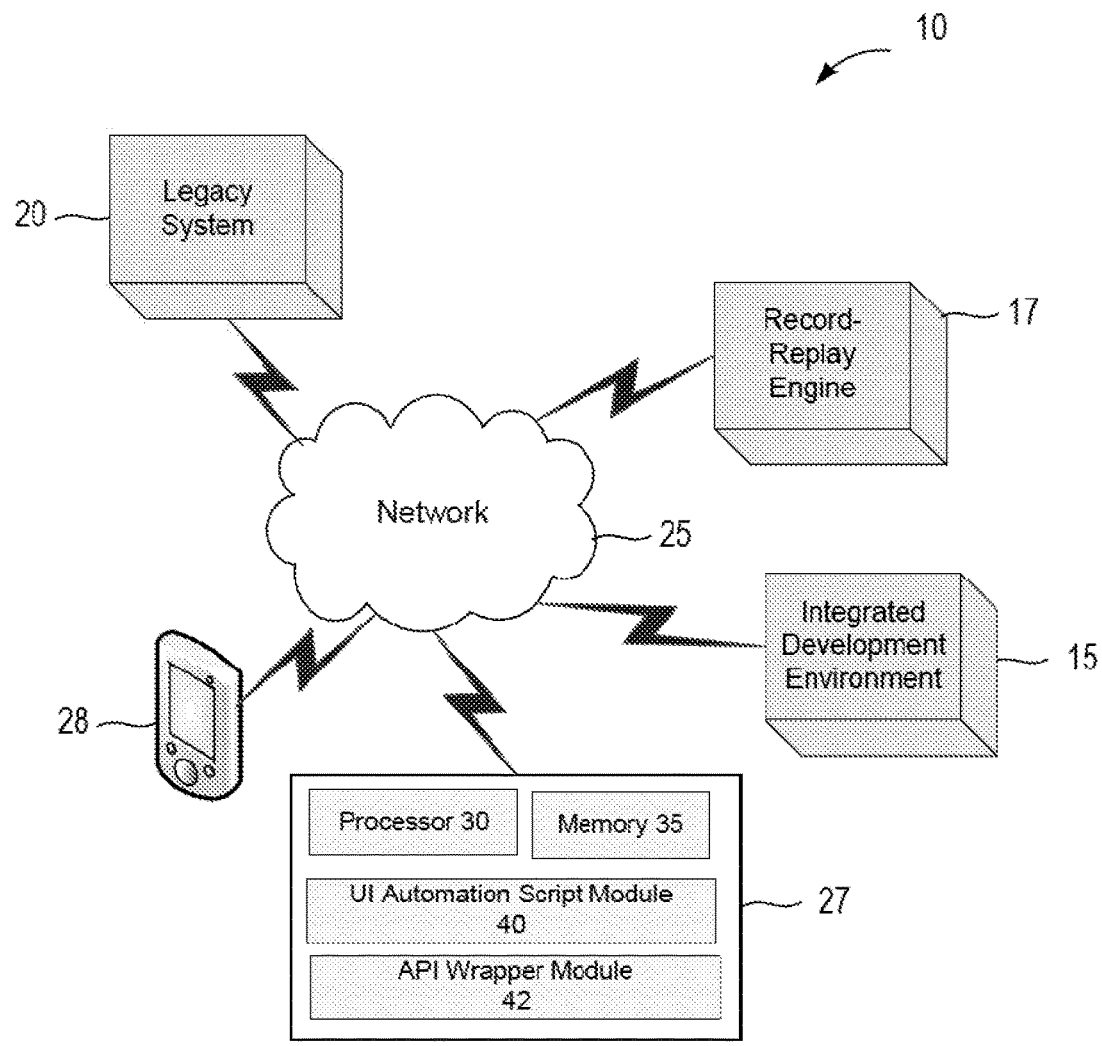
FIG. 1 is a schematic illustration of an example of a system for creating mobile applications for existing legacy systems in accordance with an implementation of the present disclosure.

With the recent improvements in technology, mobile communication devices (e.g., smartphones, tablets, etc.) continue to play an increasing role in people's life. Different users rely on such mobile devices for many day-to-day activities and work related tasks. Many business and large enterprises currently have a number of existing legacy systems that may be available to their user via a the World Wide Web but are not available via a mobile device because these organizations have not developed designated mobile applications for these legacy systems.

Due to the popularity of mobile devices, these organizations may desire to modernize their existing legacy systems and to make them compatible with mobile communication devices. In order to make the existing legacy systems available to a mobile device, organizations must develop new mobile applications for each of the existing legacy systems. The task of creating mobile applications for existing legacy systems is important for any business that wishes to keep up with the mobile users that expect to have mobile access to services, personal data, and content at all times.

Some new mobile applications for existing legacy systems need to be developed from scratch by using the information available in the legacy systems and the existing application programming interfaces (API's) (e.g., Web Services, REST API's, etc.) of the legacy systems. These newly created mobile applications depend on communication with the legacy backend servers and back office systems of the existing legacy systems. Specifically, the mobile devices running the mobile applications often use existing public API's exposed by the legacy systems.

Many times, creating mobile applications for existing legacy systems may not be as easy as mapping the existing legacy API's to identify missing APIs required by the mobile application and implementing the missing API's in the legacy system. In many situations, adding the missing API's to the legacy system is a very long process which delays the implementation of the mobile application until the missing API's are completed. It is possible that adding the missing API's in the legacy system can take more time then developing the new mobile application.

In addition, the developers of the mobile applications may not have access to the original source code or the API's in the back end of the legacy systems. The source code for a legacy system may be old and written in a framework that is no longer supported. In many cases, existing legacy systems are so old that no documentation exists on how the systems were built and what specific source code was used. Thus, when attempting to write a mobile version of the existing legacy system (e.g., a web application), it may easier to write a brand new application than to try and use the APIs from the legacy web application. However, writing a brand new application requires rewriting a lot of source code that was already used for the legacy application.

Mobile application developers may generally have access to the uniform resource locator (URL) of the existing legacy system (i.e., they can see an existing running web application in their browser). They may also know how the legacy system works. For example, if the legacy system is an "Employee Directory" web application that is designed for finding data for an employee, the developers may know that they must enter the name of the employee in order to receive some return data (e.g., job description, phone number, etc.) from the existing legacy system.

The present description is directed to systems, methods, and computer readable media for creating and operating a mobile application for an existing legacy system while speeding up the mobile application devotement cycle. The proposed solution proposes using a record-replay engine at the user interface (UI) level of the existing legacy system to record UI automation scripts of the functions (i.e., API's) of the legacy system. The recorded UI automation scripts are wrapped with an API wrapper of the mobile application that is called by the mobile application when an action in the legacy system needs to be performed by the mobile application.

Thus, this novel and previously unforeseen approach allows mobile application developers to create missing API's or wrap existing API's of the legacy system in a very short period of time by using a user friendly, UI level interface. Mobile application developers can develop applications fast, without knowing the specifics of the legacy API's and without the need to wait for delay development until legacy API's are exposed by the backend server of the legacy system.

Further, developers can continuously and quickly verify the health of the mobile applications, by testing the UI automation scripts, determining whether failed scripts exist, and identifying the mobile applications that use them. In the cases of failure, the developers can fix the automation script itself, without having to provide a fix for the mobile application. This verification technique can serve as a safety net for the mobile applications that can be validated and checked on a daily basis in production because the UI automation scripts serve as production applications and are not only executed for testing purposes.

In an example implementation, a method for creating and operating a mobile application is provided. The method includes encapsulating a plurality of user interface (UI) automation scripts of an existing legacy system with an application programming interface (API) wrapper associated with a mobile application. As explained in additional detail below, the plurality of UI automation scripts may be exiting or may be recorded. In response to a call from the mobile application, the method further includes utilizing a selected one of the plurality of recorded UI automation scripts in the API wrapper to execute at least one action in the legacy system. The method also includes returning results from the at least one action in the legacy system to the mobile application.

In another example implementation, a system that includes a mobile integrated development environment (IDE), a record-replay engine in communication with the IDE, and at least one legacy system in communication with the IDE is provided. The system also includes a computing device having a control unit to execute instructions stored in a non-transitory machine-readable storage medium. The control unit is to create at least one UI automation script of the existing legacy system by using the record-replay engine, wrap or encapsulate the at least one UI automation script with an API wrapper of the mobile application, and execute at least one action in the legacy system by calling the at least one UI automation script in the API wrapper. Further, the control unit is to continuously determine whether a failure exists in the least one UI automation script and to generate data based on at least one action in the legacy system.

As used herein, the term "legacy system" refers to an existing method, computer system, program, web application, or another technology that exists, that may be outdated and may or may not be Internet-dependent. Such legacy system may exist in an organization for a long time and is it may still provide the desired functionality, even though newer technology or more efficient methods of performing the tasks of the legacy system may be available. Organizations may have different reasons for keeping an existing legacy system. For example, the legacy system works satisfactorily and there is no reason for changing it; the costs of redesigning or replacing the system are excessive; etc.

As used herein, the terms "mobile device" and "wireless device" may be used interchangeably and refer to any one of various smartphones, cellular telephones, tablets, laptop computers, personal data assistants (PDA's), VoIP phones, wireless enabled televisions, wireless enabled entertainment systems, and other similar electronic devices that include a processor and are capable of sending and receiving wireless or wired communication signals.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

FIG. 1 is a schematic illustration of an example of a system 10 for creating and operating mobile applications for existing legacy systems. The system 10 includes at least one computing device 27 operated by a user (not shown), an Integrated Development Environment (IDE) 15 (e.g., a mobile IDE) connected to the computing device 27, a record-replay engine 17 in communication with the IDE, at least one legacy system 20 in communication with the IDE, and a network 25. The mobile application (not shown) created on the IDE runs on at least one mobile device 28 that can include a smartphone, a tablet, a laptop, a PDA, a wireless television, a wireless entertainment system, and other similar wireless devices.

The mobile device 28 include software, hardware (e.g., processor, memory, etc. not shown), or a suitable combination thereof configured to enable functionality of the mobile device 28 and to allow it to interact with the one or more external systems (e.g., the computing device 27, the IDE 15, etc.) or any other devices. For example, the mobile device 28 includes communication interfaces (e.g., a Wi-Fi® interface, a Bluetooth® interface, a 3G interface, a 4G interface, a near filed communication (NFC) interface, etc.) that are used to connect with the other wireless devices and/or to a network.

In one example, the IDE 15 is in communication with the computing device 27 operated by a developer (not shown) for developing or updating a mobile application. The computing device 27 can be a developers workstation and can include a personal computer, a laptop, a server, a plurality of distributed computing devices, or any other suitable computing device. In the illustrated example, the computing device 27 includes a processor 30, a memory 35, a UI automation script module 40, and an API wrapper module 42 for creating UI automation scripts of the legacy system 20 and for encapsulating the automation scripts with an API wrapper to execute actions on the legacy system 20 by using scripts in the API wrapper.

The at least one legacy system 20 may be any existing legacy system in a business or an organization. The legacy system 20 includes software operable by hardware (e.g., processor, memory, etc. not shown), or any suitable combination thereof configured to enable functionality of the legacy system 20 and to allow the system 20 to be accessed from a web browser (e.g., by using the computing device 27 or the mobile device 28).

The mobile IDE 15 is a software application that provides a platform for mobile developers or programmers to develop a mobile application. The IDE 15 may include a source code editor, build automation tools, a debugger, or any other components (none of the elements of the IDE 15 are illustrated). The a record-replay engine 17 is a software application (e.g., TruClient® by Hewlett-Packard, or any other record/reply system) that allows a developer to access the web interface of the legacy system 20 and to record UI automation scripts that perform specific actions on the legacy system. The IDE 15 and the record-replay engine 17 can be stored on the computing device 27 or may be remote to the computing device 27. When the IDE 15 and the record-replay engine 17 are not stored on the computing device 27, they may be accessed via the network 25.

The computing device 27 is connected to the legacy system 15, the IDE 15, the record-replay engine 17, and the at least one mobile device 28 via the network 25. The network 25 allows each of these devices to communicate with the computing device 27 and with any other systems or devices. The network 25 may include any suitable type or configuration of network to allow for communication between the devices of the system 10.

For example, the network 25 may include a wide area network ("WAN") (e.g., a TCP/IP based network, a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a Digital Enhanced Cordless Telecommunications ("DECT") network, a Digital AMPS ("IS-136/TDMA") network, or an Integrated Digital Enhanced Network ("iDEN") network, etc.). The network 25 can further include a local area network ("LAN"), a neighborhood area network ("NAN"), a home area network ("HAN"), a personal area network ("PAN"), a public switched telephone network ("PSTN"), an Intranet, the Internet, or any other suitable network.

The computing device 27 provides functionality to communicate with the elements of the system 10 and to receive and process information or data received from the legacy system 20, the network 25, and/or any other devices external to the computing device 27. As explained in additional detail below, the computing device 27 is operable to create, operate, and test a mobile application for the legacy system 20. In addition, the computing device 27 may provide the mobile application for the legacy system 20 to the mobile device 28 or any other mobile device. It is to be understood that the operations described as being performed by the computing device 27 that are related to this description may, in some implementations, be performed by any other computing device (e.g., a computing device in the mobile device 28).

As described in additional detail below, in one example, the computing device 27 creates or records at least one UI automation scripts of the existing legacy system by using the record-replay engine 17 and wraps the UI automation script with an API wrapper of the mobile application. The computing device 27 executes at least one action in the legacy system 20 by calling the at least one UI automation script, continuously determines whether a failure exists in the automation script, and generates data based on the at least one action in the legacy system.

Figure 2:
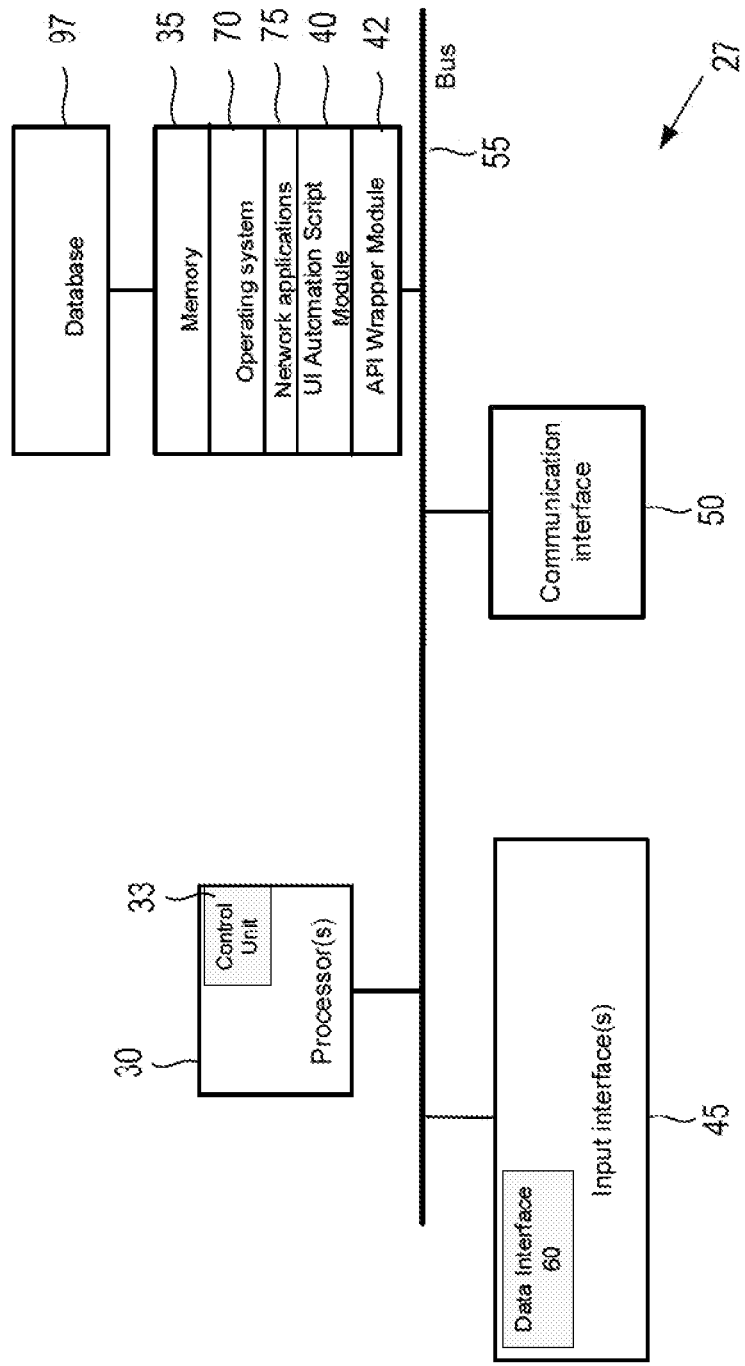
FIG. 2 illustrates a schematic representation showing an example of a computing device of the system of FIG. 1 in accordance with an implementation of the present disclosure.

FIG. 2 shows a schematic representation of the computing device 27 of the system 10. The computing device 27 can be any suitable computing device or a group of distributed computing devices capable of carrying out the techniques described below. The computing device 27 includes a processor 30 (e.g., a central processing unit, a group of distributed processors, a microprocessor, a microcontroller, or another suitable programmable device), a memory 35, input interfaces 45, and a communication interface 50. Each of these components is operatively coupled to a bus 55. In other examples, the computing device 27 includes additional, fewer, or different components for carrying out similar functionality described herein.

The communication interface 50 enables the computing device 27 to communicate with a plurality of networks and communication links. The input interfaces 45 can receive information from the legacy system 20, the network 25, and other external systems/systems in communication with the computing device 27. In one example, the input interfaces 45 include at least a data interface 60. In other examples, the input interfaces 45 can include additional interfaces. In one example, the data interface 60 receives information associated with at least one mobile application that runs on the computing device 27 (i.e., for development or testing purposes) when this device communicates with the legacy system 20. For example, the data interface 60 can receive employee information when the legacy system 20 is an "Employee Directory" web application that allows finding a company employee based a data entry (e.g., employee name or employee ID).

The processor 30 includes a controller 33 (also called a control unit) and may be implemented using any suitable type of processing system where at least one processor executes computer-readable instructions stored in the memory 35. The memory 35 includes any suitable type, number, and configuration of volatile or non-transitory machine-readable storage media 37 (shown in FIG. 3) to store instructions and data. Examples of machine-readable storage media 37 in the memory 35 include read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, an SD card, and other suitable magnetic, optical, physical, or electronic memory devices. The memory 35 may also be used for storing temporary variables or other intermediate information during execution of instructions to be executed by processor 30.

The memory 35 may also store an operating system 70, such as Mac OS, MS Windows, Unix, or Linux; network applications 75; and various modules (e.g., the UI automation script module 40, the API wrapper module 42, etc.). The operating system 70 can be multi-user, multiprocessing, multitasking, multithreading, and real-time. The operating system 70 can also perform basic tasks such as recognizing input from input devices, such as a keyboard, a keypad, or a mouse; sending output to a projector and a camera; keeping track of files and directories on memory 35; controlling peripheral devices, such as printers, image capture device; and managing traffic on the bus 55. The network applications 75 include various components for establishing and maintaining network connections, such as computer-readable instructions for implementing communication protocols including TCP/IP, HTTP, Ethernet, USB, and FireWire.

Software stored on the machine-readable storage media and executed by the processor 30 includes, for example, firmware, applications, program data, filters, rules, program modules, and other executable instructions. The control unit 33 retrieves from the machine-readable storage media and executes, among other things, instructions related to the control processes and methods described herein.

Figure 3:
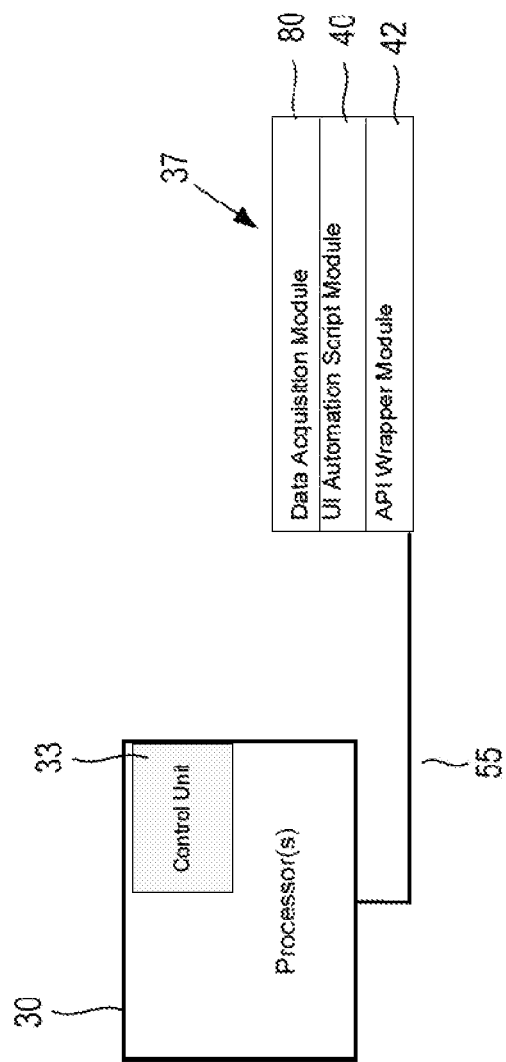
FIG. 3 is a schematic illustration showing an example of a machine-readable storage medium encoded with instructions executable by a processor of the computing device of the system of FIG. 1 in accordance with an implementation of the present disclosure.

FIG. 3 illustrates an example of a machine-readable storage medium 37 encoded with instructions executable by the processor 30 of the system 10. In one example, the machine-readable storage medium 37 includes a data acquisition module ("DAQ") 80, the UI automation script module 40, and the API wrapper module 42. In other examples, the machine-readable storage medium 37 can include more or fewer modules (e.g., various other modules related to the operation of the system 10). As explained in additional detail below, the UI automation script module 40 provides various computer-readable instruction components for creating UI automation scripts of the legacy system 20. Further, the API wrapper module 42 provides various computer-readable instruction components for encapsulating the automation scripts with an API wrapper and executing actions in the legacy system 20 by calling the API wrapper with a mobile application.

Information and data associated with the system 10, the mobile devices 15, and other systems/devices can be stored, logged, processed, and analyzed to implement the control methods and processes described herein. In addition to the data acquisition module 80, the memory 35 includes at least one database 97. Further, the system 10 can also include other databases (not shown) in the computing device 27 for the mobile device 28 when the mobile application runs on the mobile device) or stored remotely of these device. The DAQ module 80 receives UI automation scripts from the legacy system 20 associated with mobile applications that run on the computing device 27.

As noted earlier, the goal of the proposed method, system, and computer readable media is to assist mobile application developers with creating and operating mobile applications for existing legacy systems (e.g., the system 20). In some cases, the API's required by the developed mobile application for these legacy systems are missing from the legacy system. Often, such legacy API's are poorly documented or not documented at all. On the other hand, developing new API's may take too much time to develop and that will slow down the development and the implementation of the mobile application.

In one example, newly developed mobile applications may require the following API's from the legacy system: a) type 1 API's that exist in the legacy system, that are well documented, and can be readily used by the mobile application; b) type 2 API's that exist in the legacy system and are documented, but belong to a third party service the organization doesn't control (e.g., Google API's); c) type 3 API's that are missing in the existing internal legacy systems; and d) type 4 API's are other typed of API's in the legacy system, such as API's that are missing in a third party service that the organization doesn't control. The type 4 APIs make the problem more acute for the organization trying to develop a mobile application, as it is usually difficult, expensive, and in many cases practically impossible to "force" a third party external vendor to expose a non-existing API.

In order to allow the development of mobile application to progress in the above-identified situations, this description proposes a solution that allows a rapid development of mobile applications for existing legacy systems based on the UI layer of the legacy systems. The proposed solution does not require specific knowledge of the source code of the legacy systems, their API's, or any missing API's required by the mobile applications for the legacy systems. Specifically, the problem with the missing legacy API's from the legacy systems can be solved by recording, editing, and wrapping at least one automated script of the legacy system (e.g., with an API wrapper of the mobile application). The automated script is recorded with a record-replay engine and includes the recorded functions/operations of legacy system at UI level. When the API wrapper is called at the mobile application, the automation script replays the functions of the legacy system based on existing API's of the legacy system to the mobile application (i.e., without having any details of the API's and even if there are missing API's).

Thus, in some cases, the new API wrapper for the mobile application may consume only one existing API of the legacy system. In many cases, the API wrapper may have to consume a bundle of information retrieved from several API's from all four types legacy API's. Specifically, the API wrapper may often consume information and services from different applications—some internal, and some external to the organization. The proposed solutions allows the developer of the mobile application to develop a business process that accesses several services in one UI action, instead of having to access each of the existing web applications in its turn, each with its own UI and limitations. If a business process requires logging into one legacy application using a specific browser version, and then logging into another legacy application using another browser version, the proposed solution allows performing both of these actions in one click from the mobile device for which the new application is developed.

Using an API wrapper in the mobile application that encapsulates UI automation scripts of the legacy system 20 offers a complete control over the returned values and executed commands by the mobile application. The proposed solution that allows the developer to choose any record-reply engine she may already know and use and, possibly, to choose extensions for the mentioned record-replay engines in order to support the many different technologies used in web applications (ERM/CRM systems, Web, Web2.0, emulators, .NET, Java, etc.)

Figure 4:
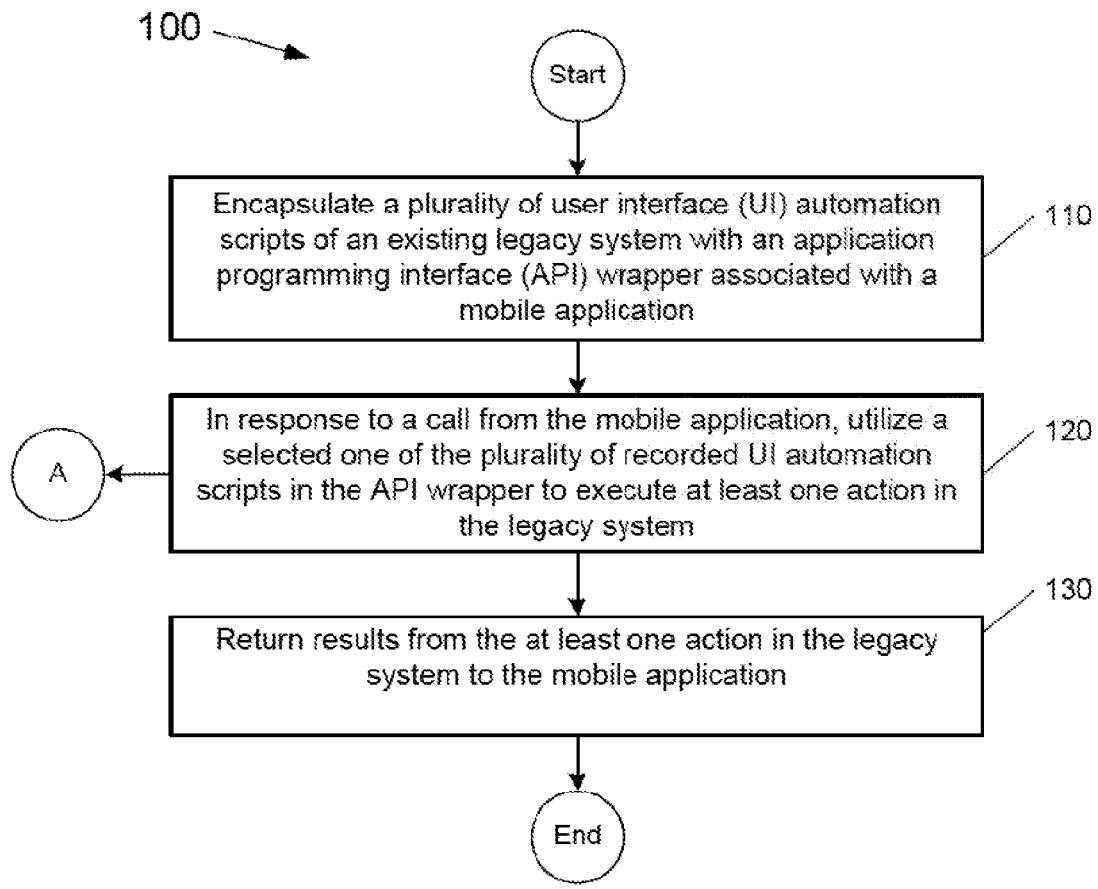
FIG. 4 illustrate a flow chart showing an example of a method for creating and operating a mobile application for an existing legacy system in accordance with an implementation of the present disclosure.

FIG. 4 illustrates a flow chart showing an example of a method 100 for creating and operating a mobile application for an existing legacy system. In one example, the method 100 can be executed by the control unit 33 of the processor of the computing device 27. Various steps described herein with respect to the method 100 are capable of being executed simultaneously, in parallel, or in an order that differs from the illustrated serial manner of execution. The method 100 is also capable of being executed using additional or fewer steps than are shown in the illustrated examples.

The method 100 may be executed in the form of instructions encoded on a non-transitory machine-readable storage medium 37 executable by a processor 30 of the computing device 27. In one example, the instructions for the method 100 are stored in the automation script module 40 and the API wrapper module 42.

The method 100 begins at step 110, where the control unit 33 encapsulates a plurality of UI automation scripts of an existing legacy system (e.g., the system 20) with an API wrapper associated with a mobile application. In other words, the plurality of recorded UI automation scripts are wrapped or encapsulated with a wrapping function (i.e., the API wrapper) that can be used to call the encapsulated/wrapped scripts to perform specific actions in the legacy system 20. Depending on the legacy system 20 and the UI scripts recorded by the developer, the API wrapper may include at least one script or a plurality of scripts. Thus, the proposed method offers developers an easy solution to create wrapping functions that can perform actions in the legacy system.

The mobile application (not show) for the legacy system may already exist or may be currently developed by a developer. In one example, the developer uses the IDE 15 to develop the mobile application. The plurality of UI automation scripts for the existing legacy system 20 may be previously recorded (e.g., by a developer or another system) and stored in the memory 35. Alternatively, the plurality of UI automation scripts for the legacy system 20 may be recorded with the control unit 33 using the IDE 15 and the record-reply engine 17. As described in additional details below, the plurality of UI automation scripts include recorded functions/operations of the legacy system 20 at UI level. It is to be understood that in some implementations the control unit 22 may record only one automation script. Instructions for recording the automation scripts are stored in the automation script module 40.

The developer does not need to know how the legacy API's in the system 20 work or where to find them, in order to create a wrapping function based on the legacy API's. All the developer needs in order to develop and operate the mobile application is access to the UI level of the system 20 to record UI automation scripts of the legacy system 20 and to encapsulate these scripts. In addition, as described in additional detail below, the mobile application may use the UI automation scripts to perform new functions at the legacy system 20.

Figure 5:
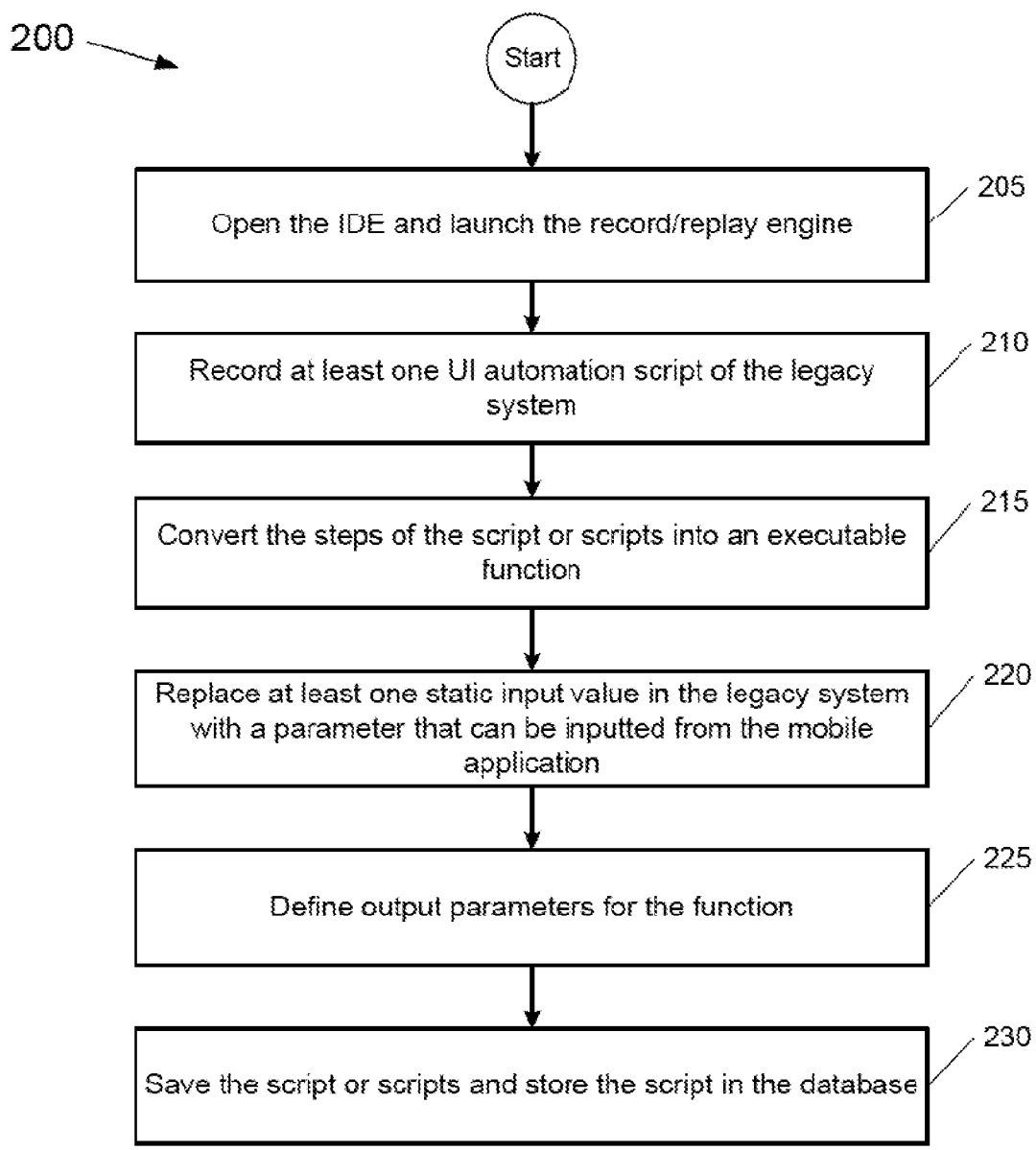
FIG. 5 illustrates a flow chart showing an example of a method for recording a plurality of user interface (UI) automation scripts of the existing legacy system in accordance with an implementation of the present disclosure.

FIG. 5 illustrates a flow chart showing an example of a method 200 for recording a plurality of UI automation scripts of the existing legacy system 20. In one example, the method 200 can be executed by the control unit 33 of the processor of the computing device 27. The method 200 begins at step 205 where the developer, with the control unit 33, opens the IDE 15 and launches the record-replay engine 17. Next, the developer, with the control unit 33, records at least one UI automation script of the legacy system 20 (at step 210). In many situations, more than one UI automation scripts of the existing legacy system 20 are recorded. The record-replay engine 17 is an intuitive record-replay tool that allows the developer to interact with the legacy web application (i.e., the legacy system 20) and to record functions that are performed by the web application.

For example, when the legacy system 20 is the "Employee Directory" described above, the developer may type the URL of the system 20, open the web page, type an employee name in a designated filed, and obtain a result (e.g., job description, phone number) based on the search performed by the system 20. All these operations or functions performed by the different API's of the legacy system 20 are recorded in the at least one script. In some implementations, the developer may record a plurality of scripts that implement different functions of the legacy system related to a specific action. Each of the plurality of recorded UI automation scripts can execute a plurality of steps related to at least one action in the legacy system. An action may include one step or a plurality of steps in the legacy system, where these steps may or may not be performed in a specific order.

For instance, if the action to be performed by the system 20 is retrieving employee information, the recorded UI automation script executes all the steps described above in order to receive the required information. Thus, one click in the mobile application can be equivalent to a plurality of clicks or steps in the legacy system.

In another implementation, the recorded UI automation script may perform functions and achieve results not enabled by the legacy system 20. For example, a user may record a UI automation script by using two open browsers, where each browser points to or displays a different legacy system. The user may perform an operation on the first legacy system that retrieves specific data, transfer (e.g., paste) the data to the second legacy system, (e.g., the system 20 as a parameter), and perform an operation on the second legacy system 20 with the new data. All these steps can be recorded in a single UI automation script and wrapped with the API wrapper. When a call is received from the mobile application, the API wrapper can utilize the selected UI automation script that operates the two legacy systems and can execute an action. Thus, a single click in the mobile application leads to performing functions on the legacy system 20 that may not be enabled by the legacy system 20 and may involve another legacy system or web application. This is a powerful solution for developers and allows them to develop an application that accesses several services in one UI action, where each service may have its own UI and limitations.

With continued reference top FIG. 5, the developer (i.e., by using the control unit 33) manipulates the created UI automation scripts. In one example, the control unit converts the steps of the script or scripts into an executable function (at step 215). Then, the developer defines or sets at least one input parameter for the function (at step 220). For example, the developer replaces at least one static input value in the legacy system 20 (e.g., the input name of the employee in the "Employee Directory") with a parameter that can be inputted from the mobile application. Next, the developer defines or sets output parameters for the function (e.g., employee's job description, phone number, etc.) that can be returned to the mobile application (at step 225).

Thus, the proposed method can insert data into the legacy system 20 and can retrieve data from the legacy system 20 with the plurality of UI automation scripts by using the input and output parameters set by the UI automation scripts. At step 230, the developer saves the script or scripts and stores the script in the database 97. During execution, several users may use the same script simultaneously. The database 97 may be a scripts repository that stores a plurality of scripts generated from the developer for different legacy systems. In one implementation, the mobile application for each legacy system may have its own repository.

With continued reference to FIG. 4, the control unit 33 calls the API wrapper with the mobile application. In response to the call from the mobile application, the control unit 33 utilizes a selected one of the plurality of recorded UI automation scripts in the API wrapper to execute or perform at least one action in the legacy system 20 (at step 120). In other words, the control unit 33 accesses the legacy system 20 with the mobile application by calling the API wrapper. The developer can open the UI of the mobile application, where the mobile application has UI that is different from the UI of the legacy system 20. In one example, the developer can call the API wrapper from the IDE 15 of the mobile application. For instance, a representational state transfer (REST) API may be used to call the API wrapper. Alternatively, the API wrapper can be called from the mobile application running on the mobile device 28.

Each of the recorded UI automation scripts may have a name that was created when the script was recorded. The control unit 33 executes at least one action in the legacy system 20 by using at least one of the plurality of recorded UI automation scripts in the API wrapper. When the API wrapper is called, the recorded script or scripts is/are triggered to replay and the required actions are performed in the legacy system 20 based on the API's of the system.

When the legacy system 20 is the "Employee Directory" described above, the executed action can be retrieving information about the employee by using the UI scripts encapsulated with the API wrapper. The method for executing least one action in the legacy system 20 by utilizing the selected one of the plurality of recorded UI automation scripts in the API wrapper is described in more details with respect to FIG. 6. At step 130, the control unit 33 returns results from the at least one action in the legacy system to the mobile application. Thus, the result of the selected script/scripts replay is the set of results requested by the calling API wrapper. For example, the control unit 33 generates data (e.g., employee's job description, phone number, etc.) based on the at least action in the legacy system. That data from the returned results is then displayed on the UI of the mobile application.

In another example, the results from the at least one action may not be returned back to the mobile application immediately. For instance, the control unit 33 may place the request to execute at least one action in the legacy system 20 in a queue and the mobile application may receive an initial confirmation that the instruction for the action are received. The control unit 33 may then execute the least one action in the legacy system 20 by using the scripts in the API wrapper at a later time and can send a confirmation to the mobile application when the action is executed. After a confirmation is sent, the control unit 33 may return the results from the at least one action in the legacy system to the mobile application.

Figure 6:
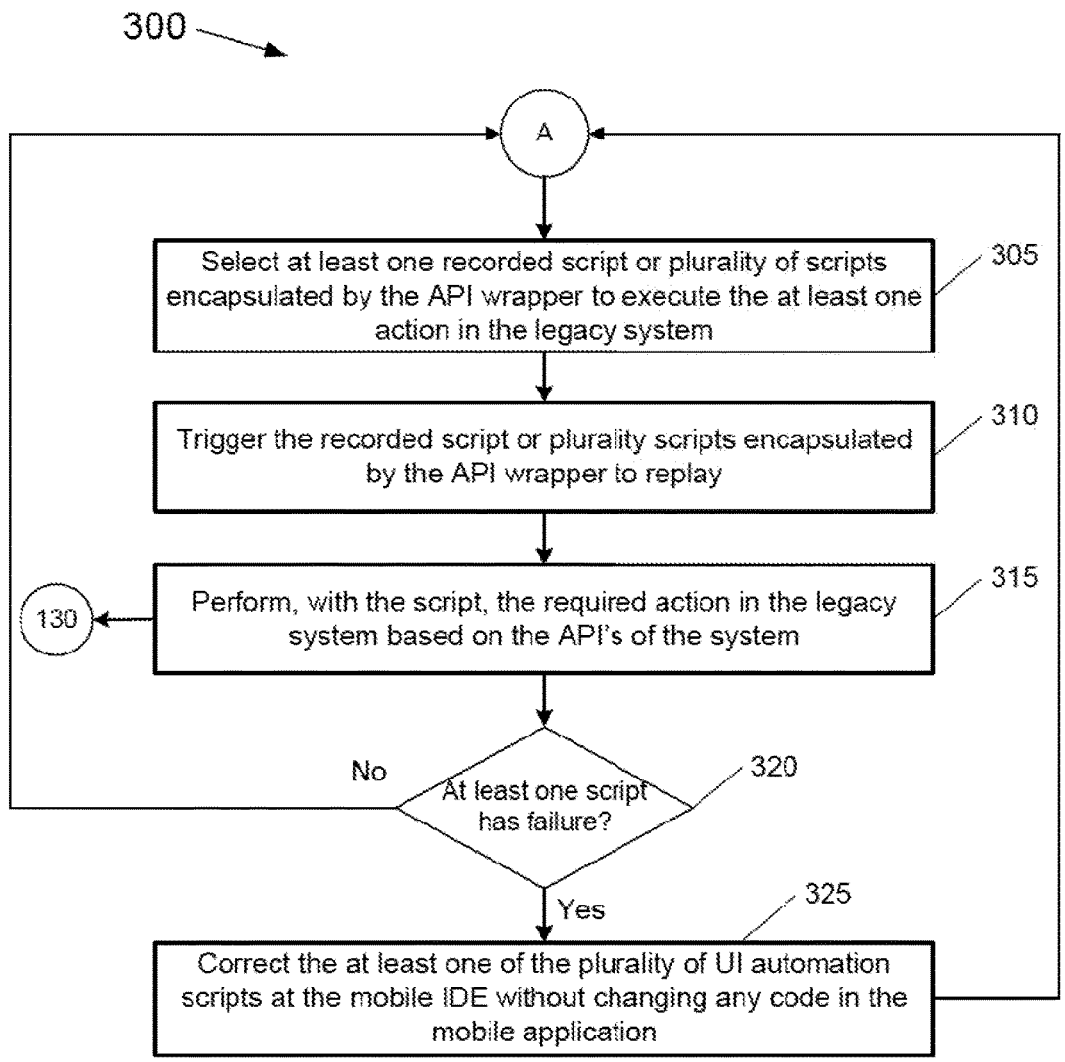
FIG. 6 illustrate a flow chart showing an example of a method for executing at least one action in the legacy system by using at selected one of a plurality of recorded UI automation scripts in an application programming interfaces (API's) wrapper in accordance with an implementation of the present disclosure.

FIG. 6 illustrates a flow chart showing an example of a method 300 for executing at least one action in the legacy system 20 by utilizing the selected one of the plurality of recorded UI automation scripts in the API wrapper. In one example, the method 300 can be executed by the control unit 33 of the processor of the computing device 27.

The method 300 begins at step 305, where the control unit 33 selects at least one recorded UI automation script or plurality of scripts encapsulated by the API wrapper to execute the at least one action in the legacy system 20. In one example, the control unit 33 selects a UI automation script by analyzing the call from the mobile application and determining what is the action that is to be executed by the legacy system 20. As noted above, an action may include one step or a plurality of steps performed by the legacy system, where these steps may or may not be performed in a specific order. In one example, the control unit 33 determines the action to be executed (and consequently the UI automation script to be selected) by analyzing the name of the script that is called from the mobile application. In other examples, the control unit 33 determines the UI automation script to be selected only based on the mobile application call. Alternatively, the UI automation script to be selected may be associated with an object on the mobile application (e.g., a link, a control button, etc.).

Next, the control unit 33 triggers the recorded script or plurality scripts encapsulated by the API wrapper to replay (at step 310). For example, the script may require that a user inputs at least one parameter in the UI of the mobile application. This may be the input parameter that was previously defined when the script was recorded (e.g., employee name). Then, the script performs the required action or actions in the legacy system 20 based on the API's of the system (at step 315). In other words, the called or selected UI automation script replays all functions in the legacy system 20 that were previously recorded based on at least one API of the legacy system. Since the script performs all necessary steps or clicks in the legacy system based on the recording, the mobile application does need to have information about the actual legacy API's that perform the functions in the legacy system. In other words, the selected UI automation script executes a plurality of steps related to the at least one action in the legacy system based on the previously recorded steps by the API's of the system 20. After step 315, the method can return to step 130 of the method 100.

At any given time during the operation of the mobile application, the system can determine the health of the mobile application by determining whether the UI automation scripts used by the mobile application are running properly. For example, at step 320, the control unit 33 determines whether a failure exists in at least one of the plurality of UI automation scripts. It is to be understood, that step 320 can be continuously performed by the system during the operation of the mobile application and does not have to come after step 315. If at least one of the UI automation scripts has a failure, the control unit 33 corrects the at least one of the plurality of UI automation scripts at the mobile IDE without changing any code in the mobile application (as step 325).

For example, the developer may simply correct the bad script or create a new script. The amount of time to do this corrections is much less than the amount of time to change the code of the mobile application. This is an advantage of the proposed system that allows quick and reliable maintenance of the mobile applications. If on the other hand, none of the UI automation scripts has a failure, the control unit can return to step 125. This technique for verifying the health of the scripts and the mobile applications can be used on daily basis, before a script executes an action on the legacy system 20, after a script executes an action, or at any other time.

Therefore, the proposed solution for creating mobile applications can be used in the final version of the mobile application. Further, the solution can also be used in pre-production stages to validate mobile use cases. The solution can act as a placeholder (i.e., a temporary solution) in the testing/development phase of the mobile application, until the missing API's in the legacy system are developed or exposed to the mobile application.

The invention claimed is:

1. A method, comprising:

encapsulating, by a controller, a plurality of recorded user interface (UI) automation scripts of an existing legacy system with an application programming interface (API) wrapper associated with a mobile application;

in response to a call from the mobile application, utilizing, by the controller, a selected one of the plurality of recorded UI automation scripts encapsulated in the API wrapper to execute at least one action in the legacy system, wherein the selected UI automation script replays functions of the legacy system based on at least one API of the legacy system, and wherein utilizing comprises utilizing the selected UI automation script to replay the functions of the legacy system based on the at least one API of the legacy system;

returning, by the controller, results from the at least one action in the legacy system to the mobile application;

determining, by the controller, that a failure exists in at least one of the plurality of recorded UI automation scripts; and correcting, by the controller, the at least one of the plurality of recorded UI automation scripts in which a failure is determined to exist without changing any code in the mobile application.

2. The method of claim 1, wherein utilizing comprises inserting data into the legacy system and retrieving data from the legacy system with the selected UI automation script by using a parameter set by the selected UI automation script.

3. The method of claim 1, further comprising recording the plurality of UI automation scripts of the legacy system with a record-replay engine at a mobile integrated development environment (IDE).

4. The method of claim 1, wherein the selected UI automation script is to execute a plurality of steps related to the at least one action in the legacy system; and utilizing comprises utilizing the selected UI automation script to execute the plurality of steps related to the at least one action in the legacy system.

5. The method of claim 1, wherein the selected UI automation script is to perform functions not enabled by the legacy system.

6. A system comprising:
a mobile integrated development environment (IDE) in communication with at least one legacy system;
a record-replay engine in communication with the IDE; and
a computing device having a control unit to:
create at least one user interface (UI) automation script of the legacy system by using the record-replay engine,
wrap the at least one UI automation script with an application programming interface (API) wrapper of the mobile application,
execute at least one action in the legacy system by calling the at least one UI automation script in the API wrapper, wherein the at least one UI automation script replays functions of the legacy system based on at least one API of the legacy system, and utilizing the at least one UI automation script to replay the functions of the legacy system based on the at least one API of the legacy system,
continuously determine whether a failure exists in the least one UI automation script,
generate data based on at the least one action in the legacy system;
determine that a failure exists in the at least one UI automation script; and
correct the at least one UI automation script in which a failure is determined to exist without changing any code in the mobile application.

7. The system of claim 6, wherein the control unit is to insert data into the legacy system and is to retrieve data from the legacy system with the at least one UI automation script by using a parameter set by the UI automation script.

8. The system of claim 6, wherein the at least one UI automation script is to execute a plurality of steps related to the at least one action in the legacy system.

9. A non-transitory machine-readable storage medium encoded with instructions executable by a processor, the machine-readable storage medium comprising instructions to:
encapsulate a plurality of recorded user interface (UI) automation scripts of an existing legacy system with an application programming interface (API) wrapper for a mobile application, where the plurality of UI automation scripts replay functions of the legacy system based on at least one API of the legacy system;
access the legacy system with the mobile application by calling the API wrapper;
utilize a selected one of the plurality of recorded UI automation scripts in the API wrapper to execute an action in the legacy system, wherein the selected UI automation script replays functions of the legacy system based on at least one API of the legacy system, and to utilize the selected one of the plurality of recorded UI automation scripts, utilize the selected UI automation script to replay the functions of the legacy system based on the at least one API of the legacy system;
generate data displayed at the mobile application based on at the least one action in the legacy system;
determine that a failure exists in at least one of the plurality of recorded UI automation scripts; and
correct the at least one of the plurality of recorded UI automation scripts in which a failure is determined to exist without changing any code in the mobile application.

10. The non-transitory machine-readable storage medium of claim 9, further comprising instructions to insert data into the legacy system and retrieve data from the legacy system with the selected UI automation script by using a parameter set by the UI automation script.

* * * * *